(12) United States Patent
Moreau et al.

(10) Patent No.: US 10,987,720 B2
(45) Date of Patent: Apr. 27, 2021

(54) FLUID CIRCULATION TUBE AND A HEAT EXCHANGER COMPRISING SUCH TUBES

(75) Inventors: Laurent Moreau, Reims (FR); Alain Bauerheim, Jonchery-sur-Vesle (FR); Philippe Metayer, Rozerieulles (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 1083 days.

(21) Appl. No.: 13/807,435

(22) PCT Filed: Jun. 21, 2011

(86) PCT No.: PCT/EP2011/060351
§ 371 (c)(1),
(2), (4) Date: Sep. 17, 2013

(87) PCT Pub. No.: WO2012/000842
PCT Pub. Date: Jan. 5, 2012

(65) Prior Publication Data
US 2014/0000853 A1    Jan. 2, 2014

(30) Foreign Application Priority Data

Jun. 30, 2010  (FR) .................................... 10/02767
Jun. 30, 2010  (FR) .................................... 10/02773

(51) Int. Cl.
*F28D 1/03*    (2006.01)
*F28F 1/40*    (2006.01)
(Continued)

(52) U.S. Cl.
CPC ............ *B21D 53/06* (2013.01); *B21C 37/225* (2013.01); *B23P 15/26* (2013.01); *F28D 1/0391* (2013.01);
(Continued)

(58) Field of Classification Search
CPC ...... F28F 1/02; F28F 1/022; F28F 1/40; F28F 2225/04; F28D 1/0358; F28D 1/0391;
(Continued)

(56) References Cited

U.S. PATENT DOCUMENTS 2,912,749 A    11/1959  Bauernfeild et al.
5,579,837 A  * 12/1996  Yu ........................ B21C 37/151
                                                    165/177
(Continued)

FOREIGN PATENT DOCUMENTS

DE    102005043093 A1    3/2007
DE    102006006670 A1    8/2007
(Continued)

OTHER PUBLICATIONS

English language abstract for DE 102005043093 extracted from espacenet.com data base on Apr. 24, 2013, 1 page.
(Continued)

*Primary Examiner* — Joel M Attey
*Assistant Examiner* — For K Ling
(74) *Attorney, Agent, or Firm* — Howard & Howard Attorneys PLLC

(57) ABSTRACT

Fluid circulation tube and heat exchanger equipped with tubes of this type are disclosed. The tube (6) is produced by bending, and, once its wall has been bent, has a base portion (12) prolonged laterally by two linking portions (13) leading to two top portions (14) turned toward one another, which terminate in end legs (15) turned toward the base portion (12), forming at least two parallel longitudinal internal channels (16) into which the two systems (20) of bends (21) of a corrugated disrupter (17) can be inserted, these systems being interconnected by a central part (23) inserted into a gap left between said legs and the base portion.

11 Claims, 3 Drawing Sheets

(51) Int. Cl.

| | | |
|---|---|---|
| *F28F 3/02* | (2006.01) | |
| *F28F 13/12* | (2006.01) | |
| *F28F 1/02* | (2006.01) | |
| *F28F 3/12* | (2006.01) | |
| *B21D 53/06* | (2006.01) | |
| *B23P 15/26* | (2006.01) | |
| *B21C 37/22* | (2006.01) | |

(52) U.S. Cl.
CPC .............. *F28F 1/022* (2013.01); *F28F 1/40* (2013.01); *F28F 3/025* (2013.01); *F28F 3/12* (2013.01); *F28F 13/12* (2013.01); *Y10T 29/49377* (2015.01)

(58) Field of Classification Search
CPC ............ F28D 1/0366; B21C 37/0818; B21C 37/0826; B21C 37/22; B21C 37/225; B21C 37/0822; B21C 37/08; B21D 53/06; B21D 53/04; B23K 1/0012
USPC ........................ 165/177, 183, 906
See application file for complete search history.

(56) References Cited

U.S. PATENT DOCUMENTS

| | | | | |
|---|---|---|---|---|
| 5,934,365 | A * | 8/1999 | Rhodes ................. | F28D 1/0391 165/153 |
| 6,192,977 | B1 | 2/2001 | Dey et al. | |
| 7,182,128 | B2 * | 2/2007 | Yu ......................... | B21C 37/08 165/177 |
| 7,665,512 | B2 * | 2/2010 | Brost ..................... | F28D 1/0391 165/177 |
| 2004/0182559 | A1 * | 9/2004 | Kent ..................... | F28D 1/0391 165/183 |
| 2007/0034366 | A1 * | 2/2007 | Igami ................... | F28D 1/0391 165/177 |
| 2007/0295490 | A1 * | 12/2007 | Haegele ............... | B21C 37/0803 165/134.1 |
| 2009/0050306 | A1 * | 2/2009 | Helms ................... | F28F 1/022 165/183 |

FOREIGN PATENT DOCUMENTS

| | | | | |
|---|---|---|---|---|
| EP | 0567409 A1 | * | 10/1993 | ............... F28F 1/02 |
| EP | 1243884 A1 | | 9/2002 | |
| EP | 1705446 A1 | * | 9/2006 | ........... B21C 37/151 |
| FR | 2823840 A1 | * | 10/2002 | ........... B21C 37/08 |
| FR | 2836546 A1 | | 8/2003 | |
| GB | 1149923 A | * | 4/1969 | ............ B21D 53/04 |
| JP | 10047875 A | * | 2/1998 | |
| JP | 2000-329488 A | | 11/2000 | |
| JP | 2000329488 A | * | 11/2000 | ........... F28D 1/0391 |
| JP | 2003-302186 A | | 10/2003 | |
| JP | 2007298201 A | * | 11/2007 | ........... F28D 1/0391 |
| JP | 2010008018 A | * | 1/2010 | ........... B21C 37/225 |
| WO | WO 06/15029 A2 | | 9/2006 | |
| WO | WO2012/000779 A2 | | 1/2012 | |

OTHER PUBLICATIONS

English language abstract for DE 102006006670 extracted from espacenet.com data base on Apr. 24, 202013, 2 pages.
English language abstract for FR 2836546 extracted from espacenet.com data base on Apr. 24, 2013, 1 page.
English language abstract and translation for JP 2000-302186 extracted from PAJ database on Apr. 24, 2013, 34 pages.
English language abstract and translation for JP 2000-329488 extracted from PAJ database on Apr. 24, 2013, 18 pages.
International Search Report for Application No. PCT/EP2011/060351 dated Aug. 16, 2012, 7 pages.
International Search Report for Application No. PCT/EP2011/059825 dated Jul. 31, 2012, 7 pages.

* cited by examiner

FLUID CIRCULATION TUBE AND A HEAT EXCHANGER COMPRISING SUCH TUBES

RELATED APPLICATIONS

This application is the National Stage of International Patent Application No. PCT/EP2011/060351, filed on Jun. 21, 2011, which claims priority to and all the advantages of French Patent Application No. FR 10/02767, filed on Jun. 30, 2010, and French Patent Application No. FR 10/02773, filed on Jun. 30, 2010, the contents of which are each incorporated herein by reference.

BACKGROUND

The present invention relates to a fluid circulation tube and to a heat exchanger including tubes of this type.

The heat exchangers in question are intended, although not exclusively, to be fitted to vehicles, and in a preferred application they form the condensers provided in the air conditioning loops or circuits of vehicles. However, the use of these exchangers as radiators of engine cooling loops or circuits could also be envisaged without departure from the scope of the invention.

Briefly, and in general terms, the air conditioning loop for the interior of a vehicle is primarily composed of the following members, considered in the direction of circulation of the coolant (such as Freon, $CO_2$, or 1234yf) flowing through it: a compressor which converts the fluid into superheated high-pressure steam, a condenser which receives the fluid and cools it to high-pressure liquid at its outlet as a result of its design in the form of a bundle of parallel tubes and the flow of external air which sweeps it, an expansion valve which reduces the pressure, and an evaporator where the expanded and condensed fluid is cooled and exchanges heat with the flow of external air to be directed into the vehicle interior. The fluid is converted to the vapor phase at its exit and is then sent to the compressor for a further cycle, and the same sequence is repeated, while the flow of external air passing through the evaporator is cooled to provide the conditioned air for the vehicle interior.

In structural terms, the condenser forming the heat exchanger comprises a bundle of parallel tubes and two headers (or header boxes) to which the corresponding ends of the parallel tubes are connected in a fixed and fluid-tight way. Thus the coolant in the loop can flow from the upstream header facing the compressor toward the downstream header facing the expansion valve, through the tubes, the fluid being made to pass from the vapor phase to the liquid phase by the external air which sweeps the tubes, whose large surface area optimizes the heat exchange.

Two main processes are used to manufacture these tubes before their assembly with the headers. These processes are extrusion, which is costly (requiring special dies for each type of tube) but produces tubes which are easily brazed because they are naturally fluid-tight, and bending, which offers other benefits, but produces tubes which are more difficult to braze.

SUMMARY OF THE INVENTION

The invention relates to fluid circulation tubes produced by the bending process.

Thin-walled tubes for condensers are generally produced from a reel of sheet metal which, after being unwound into a strip, is progressively shaped into the desired cross section (such as a flattened B shape) by special bending tools or the like, and is then cut to the desired length, in sections corresponding to the final tubes, by a cutting tool with a blade acting in a plane perpendicular to the movement of the bent strip.

Thus, in the above example, once the tube sections have been bent and cut, their thin walls have an overall cross section in the shape of a flattened B; in other words they have a base portion which is extended laterally by two linking portions leading to two top portions which are turned toward one another so as to be coplanar and parallel to the base portion, and which terminate in adjacent end legs which are turned perpendicularly toward the base portion, a gap being provided between the legs and the base portion. Two parallel longitudinal internal channels or spaces, corresponding to the loops of the B, are then formed, and two systems of bends of a disrupter or divider are inserted in a known way along the whole length of these channels, these systems being interconnected by a flat linking portion which is inserted into the gap left between the end legs and the base portion of the bent wall of the tube.

These disrupters serve, notably, to improve the thermal performance of the condenser and the mechanical strength of the tubes, which have to withstand not only the working pressure present during the operation of the loop (of the order of 20 bars) but also that stated in the technical specifications, which require, notably, that the tubes be burst-proof up to 100 bars for Freon-based coolants. Clearly, this is after the previously assembled condenser (with the tubes containing the disrupters fitted into the headers) has been placed in a brazing furnace to fix, notably, the peaks of the longitudinal corrugated bends of each disruptor to the internal face of the B-shaped wall of each tube, by means of coating (known as cladding) provided on these components (the disrupter and/or the tube wall), this cladding having a melting point slightly below that of the material (such as aluminum alloy) from which the tubes and disrupters are made.

However, a first problem encountered with these tubes concerns the insertion of the systems of bends of the disrupters into the tube channels, which may sometimes prove to be difficult or even impossible. This is because, when the tubes are cut, the free adjacent end legs of the bent walls of the tubes may not remain in their initial position produced by the bending, in other words substantially perpendicular to the base portion of the tubes, and may assume a greater or lesser degree of inclination or deflection relative to this initial position. This occurs, notably, during the cutting action with the bladed tool, which can easily drag the inlet edge of the legs with it during the cutting movement, especially as the tube walls are very thin. The legs can then be deformed at this point relative to the top portions from which they originate, and can assume an inclined, deflected position. This may also occur as a result of wear on the cutter blade, or the inaccurate positioning of the cutting tool relative to the strip bent into a B-shape, or of the bent strip which travels relative to guiding supports, or for other reasons.

Since the legs are no longer in their desired initial position which is strictly perpendicular to the base portion of the cut tube, the result is that, on the side where the inclination of the adjacent end legs is present, the corresponding receiving channel is reduced in size, while the other channel, conversely, is enlarged. It will be understood, therefore, that the deformation of the end legs which are deflected in this way, thus modifying the entry cross section of the receiving channels at the point of their cut entry edges, can prevent the insertion of the double disrupter, particularly the system of bends which is to be placed in the receiving channel which is reduced in size.

If the defective tube is identified before the insertion, it is naturally rejected; alternatively, the inclined legs are adjusted where necessary before the engagement of the disrupter. Otherwise, an attempt to insert the double disrupter into the unequal channels of the tube with the entry edges of the legs in an incorrect position results in the rejection of the tube and of the disrupter in question.

According to a first aspect, the object of the present invention is to overcome these drawbacks by means of a fluid circulation tube in which the design of the double disrupter is such that it can be fitted in the dedicated receiving channels of the tube even if the adjacent end legs of the tube are in an incorrect inclined position.

For this purpose, the fluid circulation tube for a heat exchanger, produced by bending a wall, has, when the wall has been bent, a base portion and free end legs, turned perpendicularly toward the base portion, said tube comprising a disrupter with bends provided inside said tube, said disrupter having a portion, called the central portion, which is inserted between the end legs and the base portion, parallel to the latter.

According to the invention, said central portion of the disrupter has a width between at least two adjacent bends, for example between the two systems of bends, which is equal to the sum of the thicknesses of the free end legs, increased on each side by a distance called the safety distance which allows for the range of inclinations which the legs may assume relative to their initial position perpendicular to said base portion.

Thus, because of the provision of a central portion of enlarged width facing the legs, the systems of bends of the disrupter can be inserted without difficulty into the receiving channels, even if the entry edges of the free end legs are deflected, notably after the cutting operation.

Clearly, this enlarged central portion which facilitates the introduction of the double disrupter must be acceptable in terms of dimensions, in order to ensure that the number of bends in the systems used for heat exchange and for stiffening the tube is not reduced, or is only reduced by a small amount.

Furthermore, to a first approximation, each safety distance provided on the width of the central linking portion is, at most, substantially equal to the projection onto the central portion of the height of the free end leg with an inclination of 45° relative to its nominal position perpendicular to said base portion.

However, in a more precise approximation, taking into account the result of inspections of the defective legs, each safety distance is substantially equal to the projection onto the central portion of the height of the free end leg with an inclination of between 20° and 30° relative to its nominal position perpendicular to said base portion.

In a preferred embodiment, said free end legs are adjacent and are arranged in the longitudinal plane of symmetry of the bent wall of the tube, forming two identical receiving channels into which said systems of bends, separated by said enlarged central portion, are inserted.

The profile of the bends of the disrupter may be sinusoidal or crenellated. The width L of the central portion of the disrupter is, for example, between 0.75 and 1.5 times the period of the bends of the disrupter. It is equal, notably, to approximately once the period of the bends of the disrupter.

Another problem encountered with tubes bent into a B-shape and provided with disrupters relates to the occurrence of a brazing problem at the adjacent end legs which are free in relation to the internal face of the base portion, this problem arising not only in the case of disrupters in which a system of bends is engaged in each respective channel, but also in the case of a disrupter with a central portion and two systems of bends passing through a space provided for this purpose between the legs and the base portion.

This is because, given the aforementioned pressure levels required by the technical specifications, the joint between the two free end legs and the base portion of the bent wall or the central portion of the double disrupter, formed by brazing at these points, is relatively weak and fragile and may even be subject to fracture. If a burst occurs under the pressure exerted by the fluid, the joint fails together with the inserted disrupter or disrupters, and the tubes show losses of fluid-tightness. Condensers with "burst" tubes are therefore rejected and replaced, which is a particularly costly procedure.

According to another aspect, the object of the present invention is to overcome these drawbacks, and the invention relates to a fluid circulation tube with an incorporated disrupter for a heat exchanger, produced in such a way that mechanical strength is maintained even at high pressures.

For this purpose, the tube according to the invention is produced by bending, and comprises a wall which, when bent, forms a base portion and end legs turned toward the base portion, said tube comprising at least one corrugated disrupter with bends introduced into said tube.

According to the invention, some of the bends, called reinforcing bends, of the disrupter or disrupters are arranged so as to face said end legs, in such a way that said reinforcing bend or bends form with said end legs and said base portion a joint reinforcer between said end legs and said base portion.

Thus, after the assembled exchanger (including the tubes, disrupters and header boxes) has been placed in the brazing furnace, each reinforcing bend is fixed, by brazing seams formed from the cladding which is usually deposited on the disrupter and/or on the thin wall, to the corresponding end leg and to the facing base portion. Because of these brazed joint reinforcer bends which combine the initially free end legs with the perpendicular base portion, the mechanical strength of the tubes is improved, so that the tubes can withstand high pressures without any risk of deformation or bursting. This is enhanced by the fact that the effects of capillarity and wettability are increased by the reinforcing bends in combination with the legs and base portion, since the brazing compound tends to flow into, and accumulate in, the contact areas between parts, and therefore between the reinforcing bends, the legs and the base portion.

It should also be noted that the disrupters themselves form the reinforcement of the bent tube as a result of the profile of the bends in question, without the need to add other elements.

In a first embodiment, the crosscut edges terminating the end legs are substantially in contact with said base portion, and in this case at least one corrugated disrupter is housed in said tube, for example in each of said internal channels. The joint reinforcer bend of the disrupter or disrupters is formed by a terminal bend of the disrupter which comes substantially into contact with the corresponding leg and with the base portion.

In a first example, said terminal reinforcing bend of each disrupter is bent in cross section, forming a right angle which allows said bend to be applied against the corresponding end leg and the base portion, the last two elements being perpendicular to each other.

In a second example, said terminal reinforcing bend of each disrupter forms a rounded fillet which substantially comes into contact with the corresponding end leg and the base portion, providing an internal clearance between these and said rounded fillet bend.

Regardless of the solution adopted, the tube acquires remarkable strength because of these reinforcing bends which bear on the end legs, which are initially free and adjacent in the case of a B-shaped profile, and the base wall, and because of the brazing areas or seams which are formed, notably, according to the examples, all along the edges of the angled bends and the rounded bends, filling the internal clearance in the latter configuration.

According to a second embodiment, the crosscut edges terminating the end legs are distant from said base portion and a double disrupter with two corrugated systems of bends is housed in said tube, said two corrugated systems of bends being interconnected by a flat central portion which engages in a gap provided between the end legs and the base portion of the bent wall, said reinforcing bends originating from said central portion of the disrupter and being prolonged, notably toward the corresponding top portion, in the proximity of the respective end legs. Each of the corrugated systems of bends is located, for example, in one of said internal channels.

In the second embodiment with a double disrupter, the brazing seams are formed, on the one hand, between the leg and the prolongation of the reinforcing bend which departs progressively from the leg as it approaches the corresponding top portion, and, on the other hand, between this prolongation and the base portion.

As in the first aspect of the invention, the profile of the bends of the disrupter may be sinusoidal or crenellated, preferably with trapezoidal crenellations.

According to an exemplary embodiment common to the two preceding aspects, said base portion of the tube wall is prolonged laterally by means of two linking portions and two top portions which are turned toward one another and which terminate in said end legs. Said tube forms, notably, at least two parallel longitudinal internal channels, into which two systems of bends of the disrupter, interconnected by said central portion if appropriate, can be inserted. After brazing, the peaks of the bends are fixed to said base and/or top portions. The tubes are, notably, of the thin-walled type.

The invention also relates to a heat exchanger which advantageously includes parallel fluid circulation tubes with incorporated disrupters as defined above. Preferably, the heat exchanger with these fluid circulation tubes forms the condenser of an air conditioning loop for a motor vehicle or the like.

BRIEF DESCRIPTION OF THE DRAWINGS

The attached figures will clearly show how the invention can be applied. In these figures, identical references denote similar elements.

DETAILED DESCRIPTION

Figure 1:
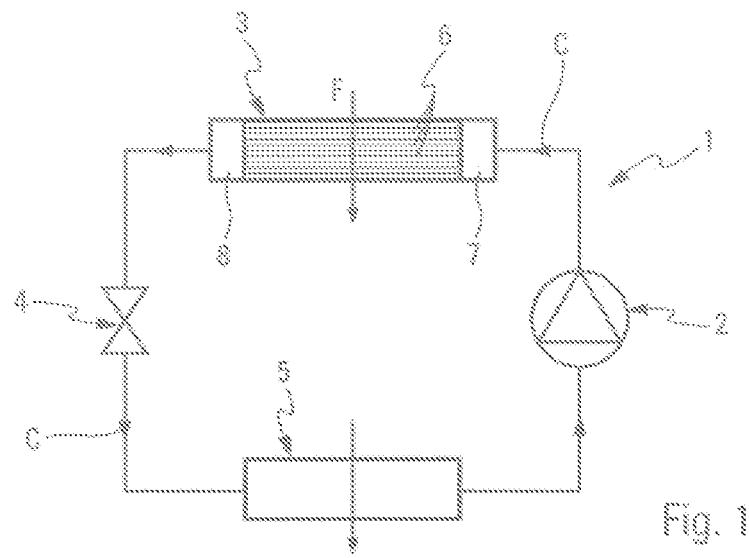
FIG. 1 is a schematic view of an air conditioning loop of a vehicle, equipped with a heat exchanger having fluid circulation tubes according to the invention.

The air conditioning loop or circuit 1 shown schematically in FIG. 1 comprises, in a known way which is described briefly below, in the direction of circulation C of the coolant, a compressor 2, a condenser 3 serving as a heat exchanger, an expansion valve 4 and an evaporator 5. The condenser 3 comprises a bundle of parallel tubes 6, whose ends are connected in a fixed and fluid-tight way to an upstream header box 7 facing the compressor 2, and to a downstream header box 8 facing the expansion valve 4, respectively.

The coolant enters the upstream header box 7 in the vapor phase, then flows through the heat exchange tubes 6 and exits through the downstream header box 8 in the liquid phase, as a result of the external air flow F, which is generally forced, and which flows perpendicularly across the tubes which actively participate in this phase change. The exchanger may also comprise corrugated dividers (not shown) between the tubes, for increasing the air exchange surface area.

For information, depending on the fluid used, the tubes 6 are subject to a pressure of about 20 bar, but must withstand a pressure of 100 bar before bursting.

Figure 2:
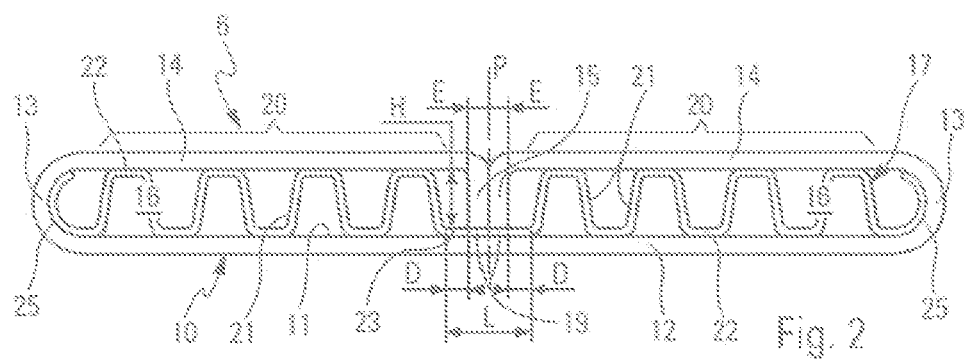
FIG. 2 is a cross-sectional view of one of the fluid circulation tubes of the exchanger, with a disrupter having a double system of bends which can be inserted into said tube in an improved way, according to the first aspect of the invention, the cross section being taken in a central portion of the tube.

A tube 6 of this type, shown in FIG. 2, is made by the bending process, in the case with which we are concerned here. It can be seen that this type of tube has a thin wall 10, with a thickness of about 0.2 to 0.5 mm, for example. It is produced by bending in such a way that, generally but not exclusively, it has a cross section in the shape of a flattened B with a longitudinal plane of symmetry P passing perpendicularly between the two loops of the flattened B.

Thus, when the wall 10 has been bent, the tube 6 is composed of a base or median portion 12 which is prolonged laterally by two rounded linking portions 13 and two identical top or upper portions 14 which are coplanar and which are parallel to the base portion 12. The top portions 14, each of which extends over about half the width of the base portion, terminate in adjacent free end legs 15, placed substantially one against the other, which are identical and are bent into a nominal position in which they should theoretically remain after bending and cutting, in other words a perpendicular position, such that they return toward the base portion 12. Thus the rounded portions 13, top portions 14 and legs 15 form, together with the base portion 12, two parallel internal channels or spaces 16, extending over the whole length of the tube 6, which are substantially identical in size in this case, since the adjacent legs are located in the plane of symmetry P of the tube. According to other embodiments, a different bending process could be used to produce more than two channels which may or may not have identical cross sections.

Additionally, a gap e is initially provided between the crosscut edges 19 terminating the free end legs 15 and the internal face 11 of the base portion 12 of the bent wall of the tube, allowing a corrugated disrupter or divider 17 to be inserted.

Figure 3:
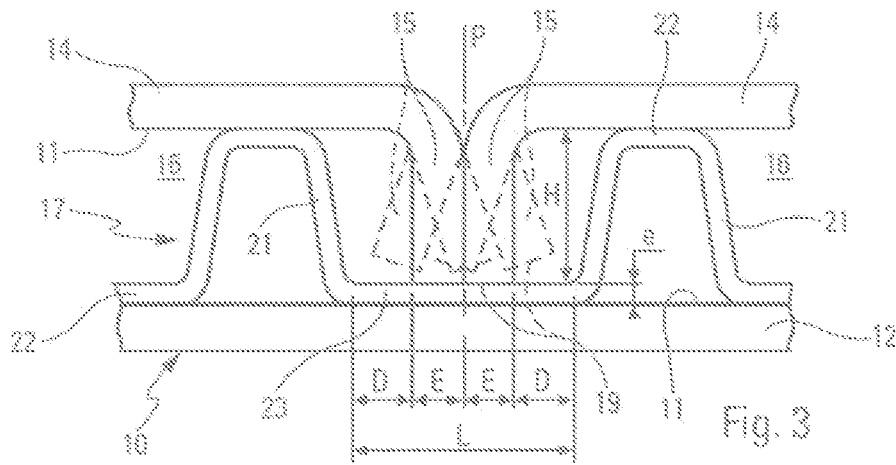
FIG. 3 is an enlarged detail A of the central portion of the tube of FIG. 2, showing, in a side view, the distance on said central portion which separates the two systems of bends of the double disrupter in order to facilitate the insertion of the latter in the presence of a possible inclination of the end legs of the tube.

These disrupters are used in order to improve the thermal performance and the mechanical strength (for withstanding the coolant pressure in the condenser), a disrupter 17 being introduced into the internal channels 16 of the thin wall 10 which has been bent in this way, as shown in FIGS. 2 and 3.

It should be noted that this disrupter 17 is produced from a thin sheet of metal which, in this case, is worked into a sinusoidal corrugated shape with two systems 20 of parallel bends 21, the peaks 22 of the bends 21 touching the internal face 11 of the bent wall 10 and extending in a parallel manner along the tube 6, these systems being interconnected by a flat central portion 23. The disrupter 17 is fitted in the tube 6 by engaging and then sliding the two systems 20 of corrugated bends 21 and the flat central portion 23, respectively, into the two internal channels 16 and into the gap e between the edges 19 of the legs 15 and the base portion 12. The thickness of the disrupter is, for example, about 0.05 to 0.150 mm. In order to simplify the fitting process, provision may be made to insert the disrupter when the tube has a clearance of more than e, and then to perform a rolling operation on the assembly to complete the bending of the tube, notably by bringing the disrupter and the legs into contact with the tube walls.

In the nominal condition, in other words at a distance from the ends of the tube or at said ends if the cutting has not caused the deflection of the legs 15, the ends 19 of said legs 15 are in contact, notably by their crosscut edges, with one of the faces of the central portion 23 of the disrupter. The other face of the central portion 23 of the disrupter is in contact with the base portion (12) of the tube.

The further assembly of the disrupter 17 and the tube 6 is usually carried out by brazing in a furnace, using claddings which are not shown, deposited on the internal face of the bent wall of the tube and/or on the corrugated faces of the double disrupter.

According to the first aspect of the invention, in order to allow the disrupter 17 to be introduced easily into the tube 6 without any risk of damage to these components, the flat central linking portion 23 of the disrupter is enlarged so as to have a width L considerably greater than the sum of the thicknesses E of the two adjacent free end legs 15, which is equal to twice the thickness of the bent wall forming the tube 6. This is done in order to allow for any inclination or deflection of the adjacent legs 15 which may occur for the aforementioned reasons, although the legs should occupy a nominal position, after bending and cutting, which is substantially perpendicular to the base portion 12, in the plane of symmetry P, as shown in FIG. 2.

Thus, safety distances D shown in FIGS. 2 and 3 are added to the sum of the thicknesses E of the juxtaposed legs 15, one on each side of these legs, when the legs are in the initial perpendicular position, the aim being to allow for an acceptable range of inclinations which the legs may assume after the cutting operation relative to their nominal position perpendicular to the base portion 12.

A maximum inclination of the legs would be one in which they were bent back completely onto the internal faces 11 of the top portions 14, in such a way that each safety distance D would be substantially equal to the height H of the legs.

A more reasonable estimate of this safety distance D corresponds to an inclination of not more than 45°, and generally less than 20°-30° on either side of the longitudinal plane of symmetry P, in other words the nominal vertical position of the legs in FIGS. 2 and 3. This results in a safety distance D equal to the projection, onto the central linking portion 23, of the height H inclined at a maximum of 45°, in other words $H/\sqrt{2}$, or less if it is desired to limit the distance D to a smaller possible inclination of the legs.

The deflected positions which the entry edges of the legs 15 may assume, on either side of the plane P, are shown in broken lines in FIG. 3.

Thus the width of the flat central portion 23, separating the two systems 21 of corrugated bends 22, is substantially equal to 2(E+D), as is shown more fully in FIG. 3. Clearly, this estimate of the safety distance could be refined, reduced or increased without departure from the principle of the invention, which is that of having a sufficiently wide central linking portion 23 to enable the systems of bends of the disrupter 17 to be inserted without difficulty into the receiving channels 16 of the tube 6, even if the entry edges of the adjacent legs 15 are deflected to some extent.

It should also be noted that the extension of the width L of the central portion 23 must not be provided at the expense of the number of bends 21, which must remain acceptable in order to maintain the heat exchange and the mechanical strength of the tube. It can be seen in FIGS. 2 and 3 that, at the end of the process, the bends of the systems facing the legs are close to the latter, without compromising the integrity of the tube; on the other hand, the bends 25 facing the rounded linking portions 13 have a profile which mates with the latter portions.

A bend of the disrupter 17 which is, for example, identical to the other bends of the disrupter, originates on each side of the central portion 23.

Figure 4:
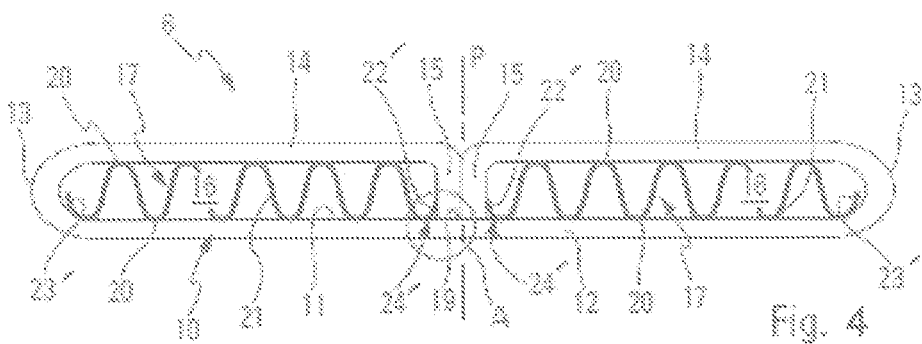
FIGS. 4 and 5 are cross sections of a fluid circulation tube of the exchanger, with disrupters composed of single systems of bends and, according to the second aspect of the invention, joint reinforcers which are rounded and right-angled respectively.
Figure 5:
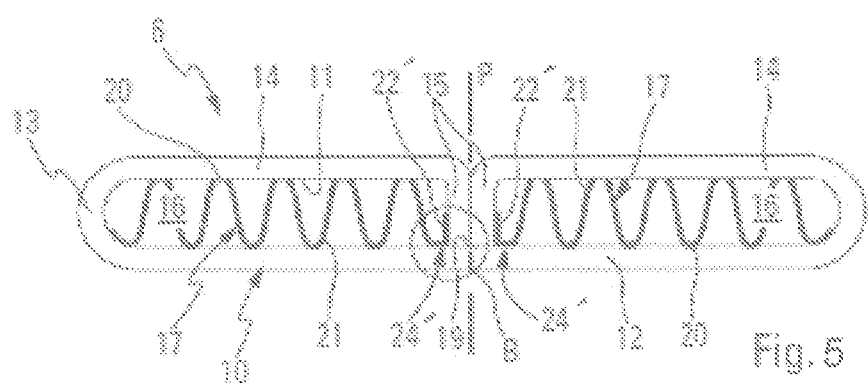
Figure 6:
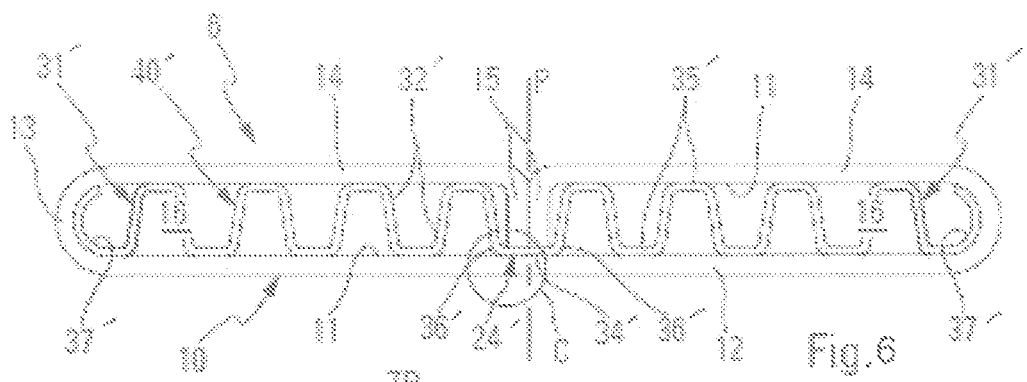
FIG. 6 is a cross section of a fluid circulation tube of the exchanger, with a disrupter having a double system of bends and, according to the second aspect of the invention, elbow-shaped joint reinforcers.

In this case also, according to the second aspect of the invention, illustrated in the subsequent figures, there is a tube 6, shown in cross section in FIGS. 4 to 6, having the same characteristics as the tube 6 described previously in relation to the preceding aspect of the invention.

Accordingly, in FIGS. 4 and 5, two disrupters 17 are introduced into the internal channels 16 of the thin wall 10 bent as described, in place of the single disrupter 17 described in relation to FIG. 2. These disrupters 17 are substantially identical and are usually produced from a thin sheet of metal which is worked, in this case, into a sinusoidal corrugated shape with a single system of bends 21, in such a way that the peaks 20 of the parallel bends 21 touch the internal face 11 of the bent wall 10 and extend in a parallel manner along the tube 6. Like the single disrupter 17 of the preceding aspect of the invention, these two disrupters 17 serve to improve the thermal performance and the mechanical strength (for withstanding the coolant pressure in the condenser).

Accordingly, one terminal bend 22' of each disrupter 17 is substantially in contact with the corresponding end leg 15, and the other terminal bend 23' substantially faces the rounded linking portion 13 of the tube 6.

The materials used for the thin wall 10 and the disrupters 17 are generally identical aluminum alloys, and claddings (not shown) are deposited on them (the thin wall and the disrupters) for the purpose of subsequent brazing in a furnace.

As shown in FIGS. 4-4A and 5-5A, the adjacent legs 15 of the thin wall 10 extend until their crosscut edges 19 are substantially in contact with the internal face 11 of the base portion 12.

According to the second aspect of the invention, the terminal bends 22' of the disrupters 17 housed in the longitudinal channels 16 also come into contact, substantially, with the end legs 15 and with the base portion 12 in question, thereby forming a joint reinforcer 24' between the end legs 15 and the base portion 12.

Figure 4A:
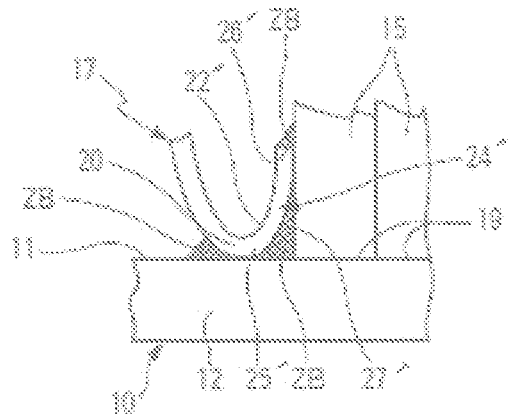
FIGS. 4A and 5A are enlarged details A and B respectively of FIGS. 4 and 5, showing, notably, the brazing areas.

In the example shown in FIGS. 4 and 4A, each terminal bend 22' forming the joint reinforcer 24' has a rounded fillet shape 25' corresponding in a simple way to the start of the sinusoidal profile, and extending between the free end leg 15 and the base portion 12. The longitudinal free edge 26' of the fillet 25' is located, for example, at least a third of the way up the leg from its edge, thus ensuring correct longitudinal support, and the rounded shape of the fillet, together with the leg and the base portion which are perpendicular to each other, delimits a longitudinal clearance or empty space 27'.

Thus each terminal reinforcing bend 22' is fixed to the leg 15 and the base portion 12 by brazing, when the assembled condenser (including the tubes with the incorporated disrupters and the header boxes) is placed in the furnace provided for this purpose. In a known way, claddings (not shown) for use in brazing are deposited over all or part of the two corrugated faces of the disrupter and/or on the internal face of the bent wall forming the tube. Thus, by arranging the terminal bend 22' in the angle formed by each leg with the base portion, effects of capillarity and wettability are created when the deposited brazing compound changes from the solid state to the liquid state, in which it tends to flow and accumulate around the reinforcer 24', thus being present on both sides of the peak 20 of the rounded fillet 25', while also filling the clearance 27' between this rounded reinforcing fillet 24', the leg 15 and the base portion 12, and on the free edge 26' of the fillet. The resulting brazing areas or seams are indicated by ZB in FIG. 4A and clearly show how each leg 15 is fixed by brazing to the base portion 12 with the aid of the terminal bend 22' of the disrupter 17 which acts as a reinforcer 24'.

It can be seen, therefore, that the two initially free adjacent end legs 15 are held in a sandwich formation by the reinforcing bends which are brazed along their whole length to the legs and the base portion, thus ensuring the mechanical strength of the tubes 6 even at high pressures.

Figure 5A:
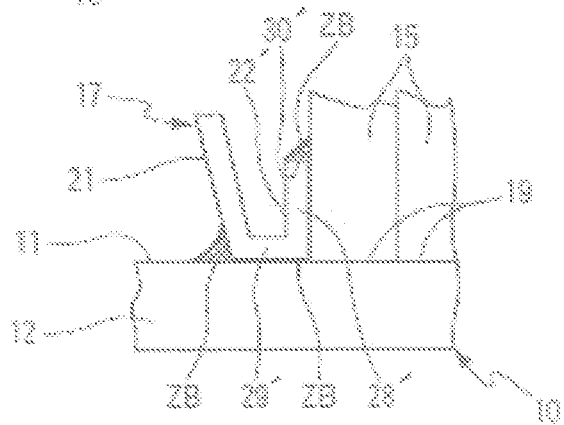

In the embodiment shown in FIGS. 5 and 5A, the terminal bend 22' of each disrupter 17 is bent to form a right angle. Thus, a first limb 28' of the bend is parallel to the leg 15 and is applied against it from its crosscut edge 19 to about one third of the way up the leg, and a second flat limb 29', bent at 90° to the first limb 28', is applied against the corresponding base portion 12. This second limb 29' is then prolonged in the usual way in a sinusoidal shape, the peaks 20 being applied, alternately, against the internal faces 11 of the base wall 12 and the top portion 14 in question.

These terminal bends 22', in the form of L-section angle pieces, constitute bent joint reinforcers 24' which fix the initially free adjacent end legs 15 as a result of brazing to the base portion 12 of the tube. In FIG. 5A, the brazing areas ZB are indicated, these areas being produced, notably, by large deposits on the free edge 30 of the first limb 28' where it meets the leg 15, and at the change of angle between the second limb 29' and the base portion 12. The brazing area ZB also extends, although with reduced thickness, between the contact surfaces of the limbs 28', 29' and the corresponding surfaces of the legs 15 and the base portion 12.

Instead of using two disrupters 17 with single identical systems of bends in the two longitudinal channels 16 of the tube 6, it is possible, in certain cases, to use only a double disrupter 40' having two separate parallel systems 31' of corrugated bends 32', of the type described in relation to the first aspect of the invention.

Figure 6A:
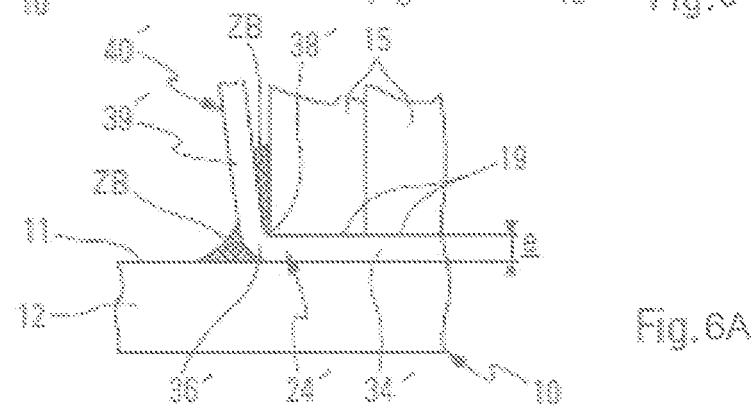
FIG. 6A is an enlarged detail C of FIG. 6, showing, notably, the brazing areas.

In this case, as shown in FIGS. 6 and 6A, the crosscut sections 19 terminating the adjacent end legs 15 of the bent tube 6 are at a distance from the internal face 11 of the base portion 12. In this case, the gap is substantially equal to the wall thickness e of the disrupter 40' and is, notably, equal to the flat central linking portion 34' of the disrupter which joins the two identical systems 31' of corrugated bends 32'. Thus, the one-piece disrupter 40' with two systems of bends 31' can be introduced by engaging the central linking portion 34' in the gap left between the edges 19 of the legs 15 and the internal face 11 of the base portion 12 of the tube 6. The two systems 31' engage simultaneously and completely in the oblong channels 16, as before, with the peaks 35' of the bends 32' interacting with the internal face 11 of the base portion 12 and the top portions 14 in question.

For the purpose of fixing the initially free legs 15, the bends forming the joint reinforcers 24' according to the invention are considered to be the first terminal bends 36' of the systems originating from the central portion 34' and turned toward the legs, as opposed to the last terminal bends 37' which are turned toward the linking portions 13. These first reinforcing bends 36' are bent at the point of the outer corners 38' of the edges 19, and are partially formed by the flat central area 34' and by the lateral prolongations 39' originating therefrom, which extend toward the respective top portions 14 and progressively depart from the end legs. The inclination imparted to these lateral prolongations 39' of the first bends 36' used as joint reinforcers 24' is reproduced in the shape of the corrugations of the two systems 31' of bends which, in the example shown in FIGS. 6 and 6A, is of the crenellated type, notably with trapezoidal crenellations. Any other appropriate shape, such as square or even sinusoidal, would also be feasible.

These first reinforcing bends 36' stiffen the bent tube 6 by means of the brazing areas ZB which are, notably, produced by the usual claddings, in the angle formed by each corner 38' between the leg 15 and the inclined prolongation 39' on the one hand, and in the angle between the inclined prolongation 39' and the base portion 12 on the other hand.

As shown in FIG. 6, the width of the central linking portion 34' is substantially equal to the sum of the thicknesses of the two adjacent legs 15. The placing of the terminal bends forming joint reinforcers on the disrupters at the point where the free ends of the legs meet the base portion of the wall causes the mechanical strength of the tube to be maintained, even under high pressure, owing to the large brazing seams which tend to be deposited in considerable amounts, notably by the capillary effect, along the terminal bends which are applied against the legs and the base portion of the tube.

The invention claimed is:

1. A fluid circulation tube for a heat exchanger the tube comprising a wall defining a base portion and free end legs, turned perpendicularly toward the base portion, a disrupter with bends provided inside the tube, the disrupter having a central portion which is inserted between the end legs and the base portion, parallel to the latter, wherein the central portion of the disrupter has, between at least two adjacent bends, a width equal to a sum of a thicknesses of the free end legs, increased on each side by a safety distance configured for a range of inclinations which the legs assume relative to their nominal position perpendicular to the base portion;

wherein the free end legs have crosscut terminal ends and the entirety of the terminal ends are in contact with one face of the central portion, and an opposite face of the central portion is in contact with the base portion;

wherein each of the safety distances are parallel to the base portion and equal to a protruded distance of a length of the free end legs, the length of the free end legs measured from the base portion to the terminal end, the free end legs being equal length, said range of inclinations including a first inclination position where both of the free end legs have an inclination of between 20° and 45° in a first lateral direction, and a second inclination position where both of the free end legs have an inclination of between 20° and 45° in a second lateral direction which is opposite the first lateral direction relative to its nominal position perpendicular to the base portion, with side surface of one of the free end legs in contact with side surface of the other of the free end legs and with the 20° and 45° being measured from an opposite side surface of each free end leg.

2. The tube as claimed in claim 1, wherein each safety distance is substantially equal to a projection onto the central portion of the height of the free end leg with an inclination of between 20° and 30° relative to its nominal position perpendicular to said base portion.

3. The tube as claimed in claim 1, wherein said free end legs are adjacent and arranged in a longitudinal plane of symmetry of the bent wall of the tube, forming two identical receiving channels into which said systems of bends, separated by said enlarged central portion, are inserted.

4. The tube as claimed in claim 1, wherein the profile of the bends of the disrupter is sinusoidal.

5. The tube as claimed in claim 1, wherein the profile of the bends of the disrupter is crenellated.

6. The tube as claimed in claim 4, wherein the width of the central portion of the disrupter is between 0.75 and 1.5 times a period of the bends of the disrupter.

7. The tube as claimed in claim 6, wherein the width of the central portion of the disrupter is substantially equal to once the period of the bends of the disrupter.

8. A heat exchanger, comprising at least a plurality of parallel fluid circulation tubes with incorporated disrupters as claimed in claim 1.

9. The heat exchanger as claimed in claim 8, wherein the exchanger forms a condenser of an air conditioning loop for a motor vehicle.

10. The heat exchanger as claimed in claim 9, wherein said free end legs are adjacent and arranged in a longitudinal plane of symmetry of the bent wall of the tube, forming two identical receiving channels into which said systems of bends, separated by said enlarged central portion, are inserted.

11. The tube as claimed in claim 2, wherein said free end legs are adjacent and arranged in a longitudinal plane of symmetry of the bent wall of the tube, forming two identical receiving channels into which said systems of bends, separated by said enlarged central portion, are inserted.

* * * * *